Figure 1:
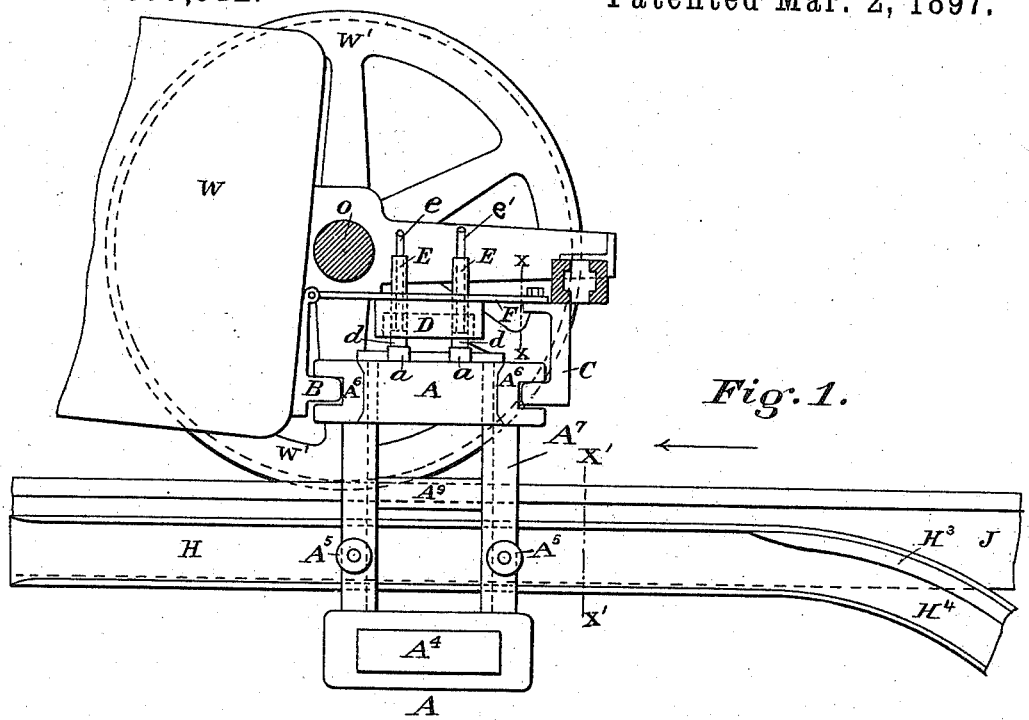

(No Model.) 3 Sheets—Sheet 1.

S. G. BROSIUS, W. B. UPTON & J. COLVIN.
ELECTRIC RAILWAY.

No. 577,912. Patented Mar. 2, 1897.

WITNESSES:
H. Wood
Chas L. Long

INVENTORS
S. G. Brosius
W. B. Upton
BY Joseph Colvin

ATTORNEY.

(No Model.) 3 Sheets—Sheet 2.
S. G. BROSIUS, W. B. UPTON & J. COLVIN.
ELECTRIC RAILWAY.
No. 577,912. Patented Mar. 2, 1897.
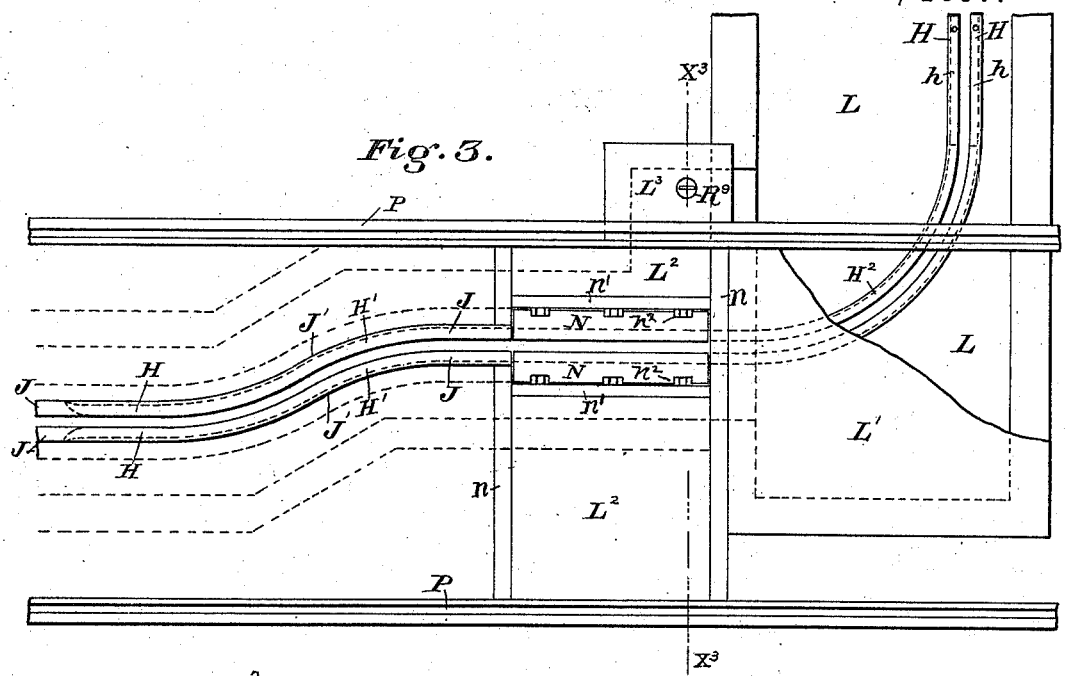
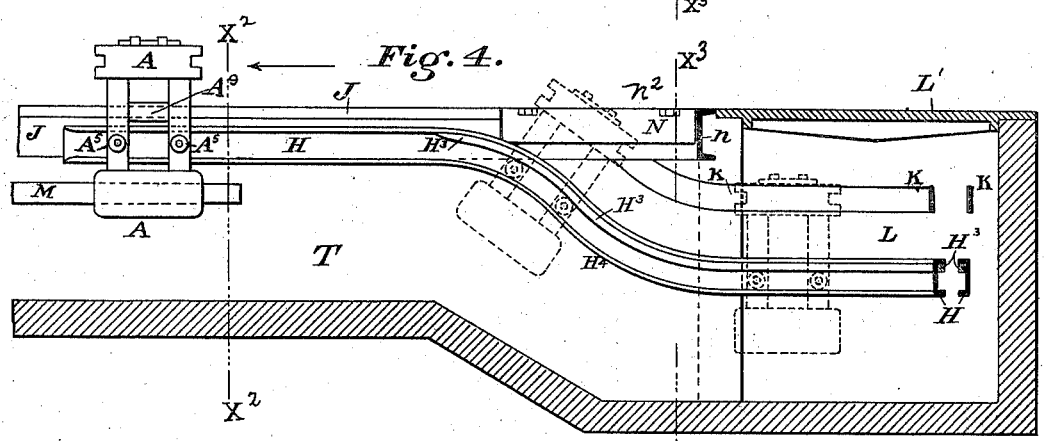
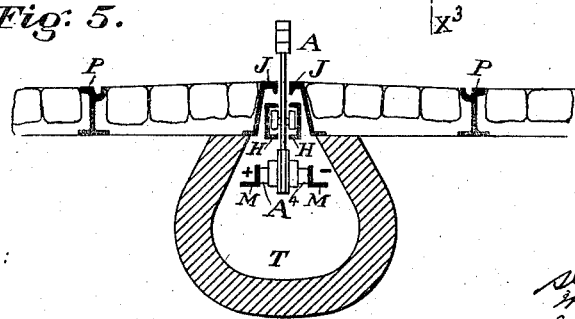
WITNESSES: INVENTORS (No Model.) 3 Sheets—Sheet 3.
S. G. BROSIUS, W. B. UPTON & J. COLVIN.
ELECTRIC RAILWAY.
No. 577,912. Patented Mar. 2, 1897.
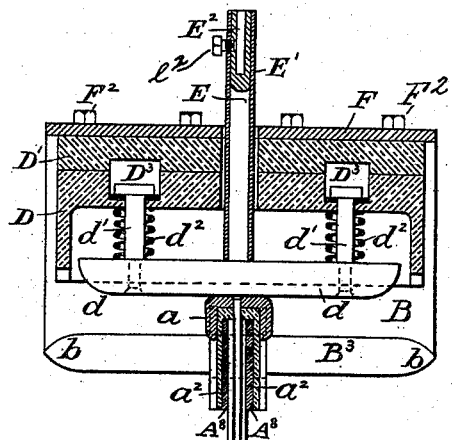
Fig. 6.
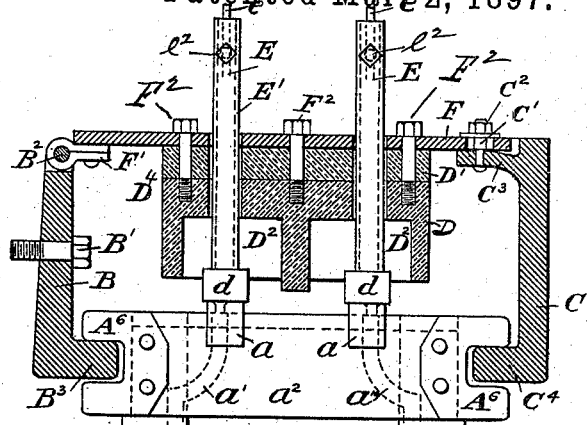
Fig. 7.
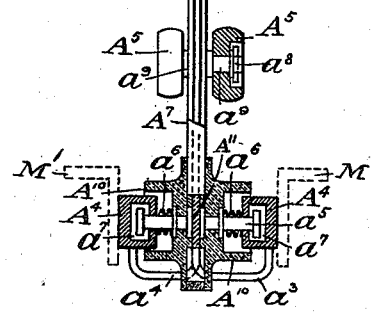
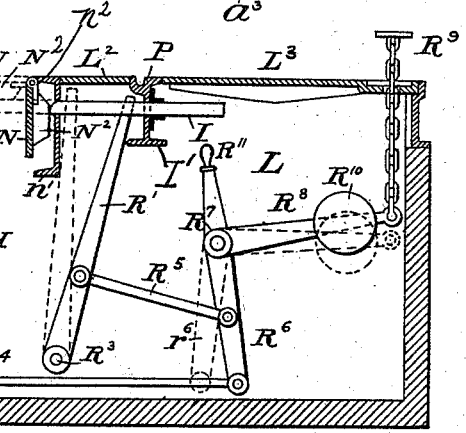
Fig. 8.
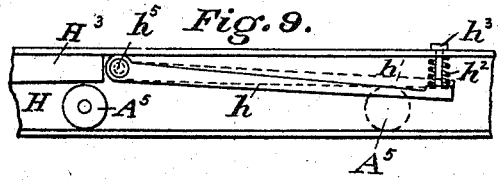
Fig. 9.
WITNESSES:
H. Wood
Chas. L. Jing
INVENTORS
S. G. Brosius
Wm. B. Upton
Joseph Colvin
BY
J. S. Rusk
ATTORNEY.

UNITED STATES PATENT OFFICE.

SAMUEL GLENVILLE BROSIUS, OF BALTIMORE, MARYLAND, AND WILLIAM BAYLY UPTON AND JOSEPH COLVIN, OF WASHINGTON, DISTRICT OF COLUMBIA.

ELECTRIC RAILWAY.

SPECIFICATION forming part of Letters Patent No. 577,912, dated March 2, 1897.

Application filed February 25, 1896. Serial No. 580,658. (No model.)

*To all whom it may concern:*

Be it known that we, SAMUEL GLENVILLE BROSIUS, of Baltimore, State of Maryland, and WILLIAM BAYLY UPTON and JOSEPH COLVIN, of Washington, District of Columbia, have invented new and useful Improvements in Electric Railways; and we hereby declare that the following is a full, clear, and exact description of the invention, which will enable others skilled in the art to which it appertains to make and use the same.

This invention relates to improvements in electric plows which are used for conducting the electric current from the trolley-rails to the motor of an electric car, and especially to that class of electric plows where the current is received from and returned through underground electric trolley-rails; and it further relates to the attachment and detachment of electric plows to and from electrically-propelled cars, and it also relates to other novel features in underground electric railways.

The various objects of our invention will appear from the following specification, and are accomplished by the mechanism hereinafter described, and shown in the drawings.

Our invention consists of certain novel features hereinafter described, and particularly pointed out in the claims.

Figure 2:
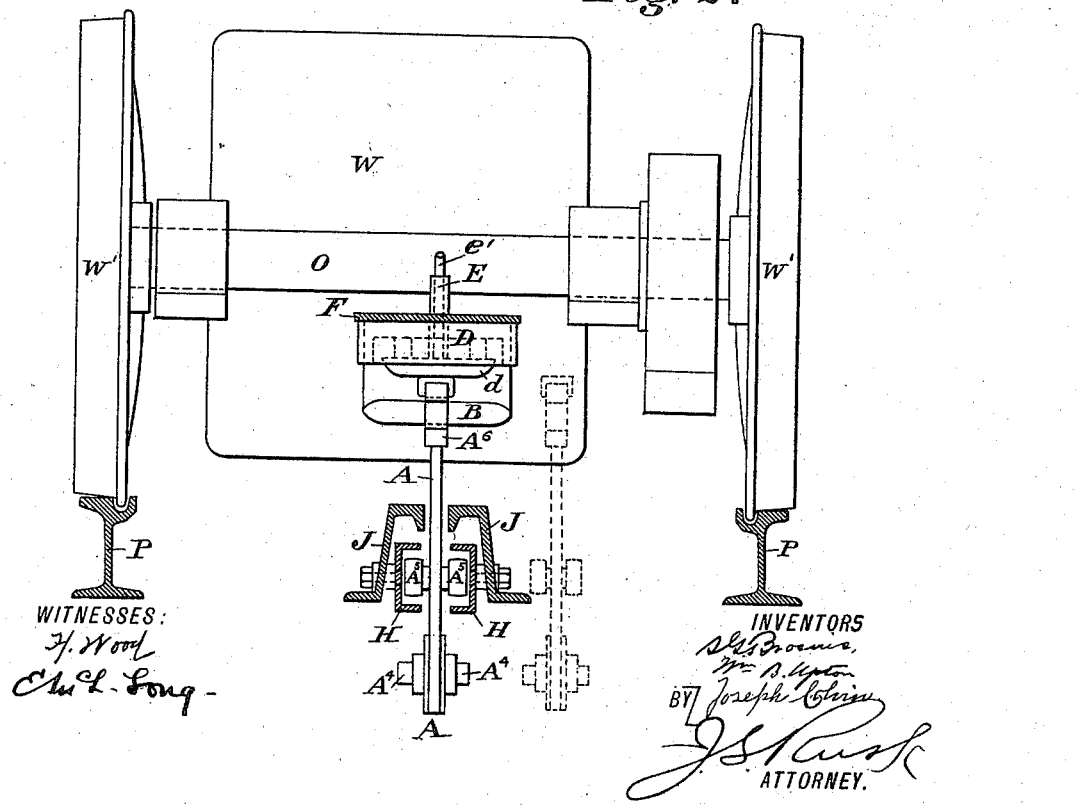

In the accompanying drawings, which form a part of this application and illustrate a construction embodying our invention, Figure 1 is a side elevation of the plow, showing it and its contact-box in position on its supporting-hangers under the car, and also showing its location in the slot-rails and channel-rails, with the motor-casing, car-wheel, and other coöperating parts. Fig. 2 is an end elevation looking in the direction indicated by the arrow, Fig. 1, and showing the plow and contact-box, sections being taken on the lines $x\,x$ and $x'\,x'$ of Fig. 1. Fig. 3 is a plan view showing the general arrangement of the slot-rails and channel-rails and the drop-traps and plow pit-vault. Fig. 4 is a longitudinal section through Fig. 3, showing the plow as it enters the channel-rails and showing in dotted lines its positions after it has been dropped from its hangers. Fig. 5 is a cross-section taken on the line $x^2\,x^2$, Fig. 4, looking in the direction indicated by the arrows through the electric conduit and showing the plow in position after its rollers have entered the channel-rails and before being dropped from its supporting-hangers. Fig. 6 is an end view, partly in section, of the plow and contact-box. Fig. 7 is a side view of the plow, contact-box, and supporting-hangers in their relative positions, the contact-box and hangers being shown in section. Fig. 8 is a cross-sectional view of the drop-trap mechanism, taken on the lines $x^3\,x^3$, Figs. 3 and 4. Fig. 9 is a detail view of the channel-rail brake.

Like letters of reference refer to like parts throughout the several views.

As shown in Fig. 1, the front wheels W' of the car are journaled on the shaft O, and said wheels run on the track-rails P. The supporting-hangers B and C are respectively attached beneath the car to the motor-casing W and to a portion of the truck or other convenient part, and the contact-box plate F is pivotally secured to the hanger B (see Fig. 7) by the bolt $B^2$ of the hinge F' and is secured to the lug $C^3$ of the supporting-hanger C by the bolt C' and nut $C^2$. The inwardly-turned flanges $B^3$ and $C^4$ of the supporting-hangers B and C respectively fit between the jaws $A^6$ of the plow and thereby support it, and said flanges are tapered at the ends $b$, so that the plow-jaws $A^6$ may readily move into position on said hanger-flanges $B^3$ and $C^4$.

The plow A is constructed of two opposite legs $A^7$, held in position (see Figs. 6 and 7) by the cross-bar $A^9$, top plates $A^8$, and bottom plate $A^{11}$. To the bottom plate $A^{11}$ the insulated shoe-boxes $A^{10}$ are secured, and in the sides of said boxes the shoes $A^4$ are carried, and each shoe is held in place by one or more springs $a^6$ and bolts $a^5$, and the head of each bolt is located in the cavity $a^7$ of each shoe $A^4$. The contact-heads $a$ are secured (see Fig. 6) to the insulated cap-box $a^2$ and electrically connected to the shoes $A^4$ by the insulated wires $a'$ and $a^{10}$, which are respectively embedded in the left and right legs $A^7$, and the wire $a'$ in the left leg is connected to the flexible wire $a^3$, and the insulated wire $a^{10}$ in the right leg is connected to the flexible wire $a^4$.

The contact-box $D^4$ is secured (see Figs. 6 and 7) to the contact-box plate F by the bolts F², and is made of insulated material and in two sections D and D', both of which are provided with the cavities D³, in which the heads of the bolts d' move, and said bolts extend through the section D and are secured to the contact-bars d, which are located in the cavities D² of the section D and are held in position by the springs d², and each bar d is also provided with the connection-stem E, extending through both sections D and D' of the contact-box D⁴ and also extends through the contact-box plate F. These connection-stems are insulated by a suitable casing E', and each has a cavity E² in the upper end, into which the ends of the electric wires e e' are secured by suitable set-screws e².

The channel-rails H (see Figs. 1, 2, 3, 4, and 5) are located within the tube T and the plow-vault L and are offset with easy curves in the horizontal plane, as shown at H', and then offset in the vertical plane, as shown at H⁴, and then again offset in the horizontal plane, as shown at H².

The slot-rails J are offset (see Figs. 3 and 4) in the horizontal plane, as shown at J', and end at the drop-traps N, which are secured by suitable hinges n² to the supporting-beams n', secured to the cross-beams n. Each trap N has on its under side the angle-lug N², (see Fig. 9,) and by means of the draw-bolts I, supported in the guides I', the said drop-traps N are opened and closed, and said draw-bolts I are controlled in their movements by the levers R and R', which are respectively pivoted on the journal-pins R² and R³.

The connecting-rods R⁴ and R⁵ are operated by the lever R⁶, which is pivoted at R⁷ and controlled by the hand-lever R¹¹ or by means of the chain-pull R⁹, connected to the lever R⁸, as may be found advisable. The counterbalance R¹⁰ may be used, and can be attached to the lever R⁸. The hand-lever R¹¹ may, if desired, be carried through the vault-cover L³ and take the place of the chain-pull R⁹. The tube T is further provided with the conductor-rails M, as shown in Fig. 4, and said tube merges into the plow-vault L, which is roofed over by suitable plates or covers L', L², and L³, as shown in Figs. 3, 4, and 8.

Referring to Figs. 6 and 7, it will be observed that the contact-heads a are in contact with the bars d and the shoes A⁴, Fig. 6, are in contact with the conductor-rails M and M'. Supposing now that the plow A has been moved into connection with the car, as shown in Figs. 1, 6, and 7, it will be observed that if the right-hand conductor-rail M is charged with positive electricity the current will pass through the right-hand shoes A⁴, thence through the flexible wire a³ to the conducting-wire a', then through the contact-head a into the contact-bar d on the right-hand side and through the stem E, and finally through the positive electric wire e to the motor, and then the current returns through the negative electric wire e', down through the connection-stem E, bar d, contact-head a on the right-hand side, conducting-wire a¹⁰, connecting flexible wire a⁴ to the shoes A⁴, and thence to the negative conductor-rail M'. The shoes A⁴ of the plow are automatically self-adjusting to any angle or unevenness which may be encountered in the construction of the conductor-rails M M', and the contact-bars d in the contact-box D⁴ are also self-adjusting to make electric contact between the contact-heads a of the plow and themselves, that is to say, for any position of the plow when it is in position on its supporting-hangers B and C and the plow-shoes are in contact with the conductor-rails M and M' the current will pass uninterruptedly from the positive rail M to the shoes A⁴ on the right-hand side of the plow and thence through the wire a³ to the conducting-wire a' in the left leg of the plow to the motor, thence back through the conducting-wire a¹⁰ in the right leg of the plow and out through the negative conductor-rail M', as previously described.

The cross-bar A⁹ is placed, as shown in Fig. 4, so as to present an unbroken surface to the slot-rails J, and thus avoid any possibility of the rear leg of the plow catching in indentations or projections which may occur in the slot-rails.

Both the legs A⁷ are provided with rollers A⁵, journaled on the pins a⁹ and secured in place by the pins a⁸, and said rollers are adapted to support the plow when disengaged from the car.

The friction-brake h is journaled on the pin h⁵ at one end, and the other end is supported by the rod h³, and the brake is normally in the position shown in full lines, Fig. 9; but when the rollers A⁵ come in contact with the brake h it is pushed upwardly, as indicated in dotted lines at h', against the tension of the spring h².

It will be readily understood that the momentum acquired by the plow from the car and by the incline of the channel-rails H, as shown at H⁴, will be overcome by said brake and the plow stopped. When desired, the plow can be withdrawn from the brake and be in readiness to be moved into connection with the car for the return trip.

The plow is dropped from connection with the car as follows: The plow A being in position on its supporting-hangers B and C is moved through the tube T by and with the motion of the car, and its shoes A⁴, one of which is arranged on each side, being in contact with the conductor-rails M and M', supply the car-motor with the required electric current. When the car approaches the point where its plow is to be dropped from the supporting-hangers B and C, the rollers A⁵ enter into the channel-rails H, and are guided into said channel-rails H by the conductor-rails M M' and the slot-rails J, all as shown in Figs. 3 and 4. The guide-rails K are placed so as to guide the head of the plow and to prevent the plow from rocking sidewise. The offset J' in the slot-rails J, in connection with the offset H' in the channel-rails H, carry the plow A sidewise out and away from the supporting-hangers B and C, and said plow is thus electrically disconnected, as indicated in dotted lines, Fig. 2. The momentum of the plow A after leaving the conductor-rails M and M' carries it forward until it assumes the inclined position shown in dotted lines at the center of Fig. 4, where it is passing through the drop-traps N, which have been previously opened to the position shown in Fig. 8. The hangers A and B, constructed with open ends, will allow the plow to drop from them without damage should the car become derailed or turned out on any track by reason of a misplaced switch, the slot-rail acting to remove the plow from the hangers in a manner similar to that above described. Continuing its movement down the channel-rails H the plow will assume a vertical position, as shown in dotted lines at the right hand of Fig. 4, within the plow-vault L and travel along the channel-rails H until it reaches the friction-brake $h$, which engages with the rollers $A^5$ and stops the plow. In double-track roads the plow can be moved around to the return-track by continuing the channel-rails H to said return-track.

Within the channel-rails H and under the upper flange the filler $H^3$ is located to reduce the size of the opening in said channel-rails, and is so placed in order that the opening, which is necessary to allow for the rise and fall due to varying loads and motions of the car, may be narrowed to clear the rollers A as they travel through them, and at the same time to prevent undue rocking, or, if desired, reduced channel-rails may be substituted for the filler $H^3$.

The drop-traps N are so located as to be opened to allow the head of the plow A to pass into the vault without interference. As shown in Fig. 8, the drop-traps are open and the operating-levers R and R' are in the position shown in full lines, and when it is desired to close said traps the operating-levers R and R' are moved to the position shown in dotted lines by means of the lever $R^{11}$ or chain-pull $R^9$, and in such movement the draw-bolts I, acting on the angle-lugs $N^2$, close said traps N and hold said traps closed in the position shown in dotted lines. The angle-lugs $N^2$ are preferably made in the shape of a wedge to facilitate the operation of raising the drop-traps N.

The counterbalance $R^{10}$ may be used to move the draw-bolts to close the traps N, in which case the chain-pull $R^9$ can be used.

The hand-lever $R^{11}$ may be substituted for the chain-pull and the counterbalance discarded or used in connection therewith, or both the hand-lever, chain-pull, and counterbalance may be used in connection if desired.

When the car is ready for the return trip, the plow A is moved upwardly from the vault L along the channel-rails H and connected to the supporting-hangers B and C.

We do not limit ourselves to the construction and arrangement shown, as the same may be varied without departing from the spirit of our invention.

Having thus ascertained the nature of our invention and set forth a construction embodying the same, what we claim as new, and desire to secure by Letters Patent of the United States, is—

1. In an electric railway, a car adapted to travel thereon and provided with a propelling-motor, positive and negative conductor-rails for the electric current, a contact-box provided with automatically-adjustable contact-bars, a plow adapted to be connected with said contact-box and in contact with said adjustable contact-bars and adapted to move in contact with said conductor-rails to carry the electric current to and from said motor for propelling the car, and means for disengaging said plow from said contact-box.

2. In an electric railway, a car adapted to travel thereon and provided with a propelling-motor, positive and negative conductor-rails for the electric current, a contact-box provided with automatically-adjustable contact-bars, a plow adapted to be connected with said contact-box and in contact with said adjustable contact-bars and adapted to move in contact with said conductor-rails to carry the electric current to and from said motor for propelling the car, and means for automatically disengaging said plow from said contact-box.

3. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move having a horizontal offset, channel-rails located in the conduit below the slot-rail and provided with a horizontal offset and adapted to support said plow when disengaged from the car, mechanism for connecting said plow to the car, and means consisting of the said horizontal offsets in the slot and channel rails for moving the plow from engagement with the car in the travel of said plow along said offsets.

4. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move and having a horizontal offset, channel-rails located in the conduit below the slot-rail for supporting the plow when disengaged from the car and provided with a horizontal offset located in the same vertical plane as the offset of the slot-rail, mechanism for connecting said plow to the car, and means consisting of the said horizontal offsets in the slot and channel rails for moving the plow from engagement with the car in the travel of said plow along said offsets.

5. In an electric railway, a car adapted to travel thereon and provided with a propelling-motor, conductor-rails for the electric current, a plow adapted to move in contact with said conductor-rails to carry the electric current to and from said motor for propelling the car and provided with rollers, a slot-rail in which said plow is adapted to move having a horizontal offset, channel-rails located in the conduit below the slot-rail adapted to receive said rollers on the plow and support the plow thereby when disengaged from the car and having a horizontal offset, mechanism for connecting said plow to the car, and means consisting of the said horizontal offsets in the slot and channel rails for moving the plow from engagement with the car in the travel of said plow along said offsets.

6. In an electric railway, a car adapted to travel thereon and provided with a propelling-motor, conductor-rails for the electric current, a plow adapted to move in contact with said conductor-rails to carry the electric current to and from said motor for propelling the car and provided with rollers, a slot-rail in which said plow is adapted to move having a horizontal offset, channel-rails located in the conduit below the slot-rail adapted to receive said rollers on the plow and support the plow thereby when disengaged from the car and having a horizontal offset located in the same vertical plane as the offset of the slot-rail, mechanism for connecting said plow to the car, and means consisting of the said horizontal offsets in the slot and channel rails for moving the plow from engagement with the car in the travel of said plow along said offsets.

7. In an electric railway, a car adapted to travel thereon and provided with a propelling-motor, conductor-rails for the electric current, a plow adapted to move in contact with said conductor-rails to carry the electric current to and from said motor for propelling the car, mechanism for connecting said plow to the car, and a slot-rail in which said plow is adapted to move provided with a horizontal offset position of the track which offset is adapted to disengage the plow from the car in the travel of the said plow along said horizontal offset.

8. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move in the travel of the car, mechanism for connecting said plow to the car, and channel-rails located in the conduit below the slot-rail and provided with a horizontal offset which is adapted to disengage the plow from the car in the travel of said plow along said horizontal offset.

9. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move in the travel of the car, channel-rails into which the plow is guided by said slot-rail and conductor-rails and adapted to support the plow when disengaged from the car, mechanism for connecting said plow to the car, and means for disengaging said plow from the car.

10. In an electric railway, a car adapted to travel thereon and provided with a propelling-motor, conductor-rails for the electric current, a plow adapted to move in contact with said conductor-rails to carry the electric current to and from said motor for propelling the car and provided with rollers, a slot-rail in which said plow is adapted to move in the travel of the car, channel-rails into which said rollers on the plow are guided by said slot-rail and conductor-rails and adapted to support the plow when disengaged from the car, mechanism for connecting said plow to the car, and means for disengaging said plow from the car.

11. In an electric railway, a car adapted to travel thereon and provided with a propelling-motor, positive and negative conductor-rails for the electric current, a contact-box provided with automatically-adjustable contact-bars, a plow adapted to be connected to said contact-box and in contact with said adjustable contact-bars to carry the electric current to and from said motor for propelling the car, and a yielding shoe on each side of said plow adapted to move in contact with said conductor-rails and to automatically adjust said plow to the variations of said conductor-rails.

12. In an electric railway, a car adapted to travel thereon and provided with a propelling-motor, positive and negative conductor-rails for the electric current, a contact-box provided with automatically-adjustable contact-bars, a plow adapted to be connected to said contact-box and in contact with said adjustable contact-bars to carry the electric current to and from said motor for propelling the car, a yielding shoe on each side of said plow adapted to move in contact with said conductor-rails and to automatically adjust said plow to the variations of said conductor-rails, and springs bearing on said shoes for holding said shoes in contact with said conductor-rails.

13. In an electric railway, a car adapted to travel thereon and provided with a propelling-motor, positive and negative conductor-rails for the electric current, a plow connected to the said car adapted to carry the electric current to and from said motor for propelling the car and provided on each side with a shoe adapted to move in contact with said conductor-rails, and insulated shoe-boxes in which the shoes are located.

14. In an electric railway, a car adapted to travel thereon and provided with a propelling-motor, positive and negative conductor-rails for the electric current, a plow connected to the said car adapted to carry the electric current to and from said motor for propelling the car and provided on each side with a yielding shoe adapted to move in contact with said conductor-rails and to automatically adjust said plow to the variations of the conductor-rails, and insulated shoe-boxes in which the shoes are located.

15. In an electric railway, a car adapted to travel thereon and provided with a propelling-motor, positive and negative conductor-rails for the electric current, a plow connected to the said car adapted to carry the electric current to and from the motor for propelling the car and provided on each side with an insulated shoe-box, and a yielding shoe on each side located in said insulated shoe-boxes and adapted to move in contact with said conductor-rails and to automatically adjust said plow to the variations of the conductor-rails.

16. In an electric railway, a car adapted to travel thereon and provided with a propelling-motor, positive and negative conductor-rails for the electric current, a plow adapted to move in contact with said conductor-rails for carrying the electric current to and from said motor for propelling the car, a positive and a negative contact-head on said plow, an insulated contact-box, and a yielding positive and a yielding negative contact-bar on opposite sides of said contact-box and supported thereby and respectively in contact with said positive and negative contact-heads and adapted to be automatically kept in contact with said positive and negative contact-heads.

17. In an electric railway, a car adapted to travel thereon and provided with a propelling-motor, positive and negative conductor-rails for the electric current, a plow adapted to move in contact with said conductor-rails for carrying the electric current to and from said motor for propelling the car, a positive and a negative contact-head on said plow, an insulated contact-box, a positive and a negative contact-bar on opposite sides of said contact-box and supported thereby and respectively in contact with said positive and negative contact-heads, and means acting on said bars for automatically keeping said positive and negative bars respectively in contact with said positive and negative heads.

18. In an electric railway, a car adapted to travel thereon and provided with a propelling-motor, positive and negative conductor-rails for the electric current, a plow adapted to move in contact with said conductor-rails for carrying the electric current to and from said motor for propelling the car, a positive and a negative contact-head on said plow, an insulated contact-box, a yielding positive and a yielding negative contact-bar on opposite sides of said contact-box and supported thereby and respectively in contact with said positive and negative contact-heads and adapted to be automatically kept in contact with said positive and negative contact-heads, and positive and negative electric connections respectively connected to said positive and negative bars for carrying the electric current through the motor.

19. In an electric railway, a car adapted to travel thereon and provided with a propelling-motor, positive and negative conductor-rails for the electric current, a plow adapted to move in contact with said conductor-rails for carrying the electric current to and from said motor for propelling the car, a positive and a negative contact-head on said plow, an insulated contact-box, a yielding positive and a yielding negative contact-bar on opposite sides of said contact-box and supported thereby and respectively in contact with said positive and negative contact-heads and adapted to be automatically kept in contact with said positive and negative contact-heads, and insulated positive and negative electric connections respectively connected to said positive and negative bars for carrying the electric current through the motor.

20. In an electric railway, a car adapted to travel thereon and provided with a propelling-motor, conductor-rails for the electric current, a plow connected to the said car adapted to carry the electric current to and from said motor for propelling the car and provided on each side with a yielding shoe adapted to move in contact with said conductor-rails and to automatically adjust said plow to the variations of the said conductor-rails, a positive and a negative contact-head on said plow, an insulated contact-box, and a yielding positive and a yielding negative contact-bar on opposite sides of said contact-box and supported thereby and respectively in contact with said positive and negative contact-heads and adapted to be automatically kept in contact with said positive and negative contact-heads.

21. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move, channel-rails located in the conduit below the slot-rail and adapted to support said plow when disengaged from the car, mechanism for connecting said plow to the car, means for disengaging said plow from the car, and a friction-brake located in the said channel-rails adapted to stop the plow in its travel along said channel-rails after the disengagement of said plow from the car.

22. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move, channel-rails located in the conduit below the slot-rail and adapted to support said plow when disengaged from the car, mechanism for connecting said plow to the car, and a yielding friction-brake located in the said channel-rails adapted to stop the plow in its travel along said channel-rails after the disengagement of said plow from the car.

23. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move, channel-rails located in the conduit below the slot-rail and adapted to support said plow when disengaged from the car, mechanism for connecting said plow to the car, means for disengaging said plow from the car, and means located in said channel-rails for preventing the rocking of the plow after the disengagement of said plow from the car.

24. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move, channel-rails located in the conduit below the slot-rail and adapted to support said plow when disengaged from the car, mechanism for connecting said plow to the car, means for disengaging said plow from the car, and a filler located in said channel-rails for reducing the opening in said rails and adapted to prevent the rocking of the plow when disengaged from the car.

25. In an electric railway, a car adapted to travel thereon and provided with a propelling-motor, conductor-rails for the electric current, a plow adapted to move in contact with said conductor-rails to carry the electric current to and from said motor for propelling the car, a contact-box plate, an insulated contact-box secured thereto, supporting-hangers connected to the said contact-plate for supporting the plow in its connection with the car, and means for disengaging said plow from the car.

26. In an electric railway, a car adapted to travel thereon and provided with a propelling-motor, conductor-rails for the electric current, a plow adapted to move in contact with said conductor-rails to carry the electric current to and from said motor for propelling the car, a contact-box plate, an insulated contact-box secured thereto, supporting-hangers connected to the said contact-plate and provided on the lower ends with inwardly-turned flanges adapted to fit between the jaws on the plow and thereby support the plow in its connection with the car, and means for disengaging said plow from the car.

27. In an electric railway, a car adapted to travel thereon and provided with a propelling-motor, conductor-rails for the electric current, a plow adapted to move in contact with said conductor-rails to carry the electric current to and from said motor for propelling the car, mechanism for connecting said plow to the car, means for disengaging said plow from the car, and means for supporting said plow when disengaged from the car.

28. In an electric railway, a car adapted to travel thereon and provided with a propelling-motor, conductor-rails for the electric current, a plow adapted to move in contact with said conductor-rails to carry the electric current to and from said motor for propelling the car, mechanism for connecting said plow to the car, means for automatically disengaging said plow from the car, and channel-rails located in the conduit for supporting said plow after its disengagement from the car.

29. In an electric railway, a car adapted to travel thereon and provided with a propelling-motor, conductor-rails for the electric current, a plow adapted to move in contact with said conductor-rails to carry the electric current to and from said motor for propelling the car and provided with rollers, and channel-rails located in the conduit and adapted to receive the rollers on said plow and support the plow after its disengagement from the car.

30. In an electric railway, a car adapted to travel thereon and provided with a propelling-motor, positive and negative conductor-rails for the electric current, a plow adapted to move in contact with said conductor-rails for carrying the electric current to and from said motor for propelling the car, a positive and a negative contact-head on said plow, an insulated contact-box composed of two sections, a positive and a negative contact-bar located in cavities on opposite sides of said contact-box and respectively in contact with said positive and negative contact-heads, and bolts connected to said contact-bars and springs located around said bolts and adapted to act on said contact-bars to automatically keep said bars in contact with said positive and negative contact-heads.

31. In an electric railway, a car adapted to travel thereon and provided with a propelling-motor, positive and negative conductor-rails for the electric current, a plow adapted to move in contact with said conductor-rails for carrying the electric current to and from said motor for propelling the car, a positive and a negative contact-head on said plow, an insulated contact-box composed of two sections, a positive and a negative contact-bar located in cavities on opposite sides of said contact-box and respectively in contact with said positive and negative contact-heads, bolts connected at their lower ends to said contact-bars and their upper ends adapted to move in cavities in said contact-box in the adjustment of said contact-bars, and springs located around said bolts and adapted to act on said contact-bars to automatically keep said bars in contact with said positive and negative contact-heads.

32. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move having a horizontal offset, channel-rails located in the conduit below the slot-rail and provided with a horizontal offset and with a vertical offset and adapted to support said plow when disengaged from the car, mechanism for connecting said plow to the car, means consisting of said horizontal offsets in the slot and channel rails for moving the plow from engagement with the car in the travel of said plow along said offsets, a plow pit-vault in which said channel-rails are located, drop-traps over said pit-vault and adapted when opened to permit the travel of said disengaged plow along the vertical offset of said channel-rails into the plow pit-vault, and mechanism for opening said drop-traps.

33. In an electric railway, a car adapted to travel thereon and provided with a propelling-motor, conductor-rails for the electric current, a plow adapted to move in contact with said conductor-rails to carry the electric current to and from said motor for propelling the car, a slot-rail in which said plow is adapted to move having a horizontal offset, channel-rails located in the conduit below the slot-rail and provided with a horizontal offset and with a vertical offset and adapted to support said plow when disengaged from the car, mechanism for connecting said plow to the car, means consisting of said horizontal offsets in the slot and channel rails for moving the plow from engagement with the car in the travel of said plow along said offsets, a plow pit-vault in which said channel-rails are located, drop-traps over said pit-vault and adapted when opened to permit the travel of said disengaged plow along the vertical offset of said channel-rails into the plow pit-vault, mechanism for opening said drop-traps, and mechanism for automatically closing said drop-traps after the passage of the disengaged plow along the channel-rails into the plow pit-vault.

34. In an electric railway, a car adapted to travel thereon and provided with a propelling-motor, conductor-rails for the electric current, a plow adapted to move in contact with said conductor-rails to carry the electric current to and from said motor for propelling the car, channel-rails located in the conduit and provided with a horizontal offset for disengaging the plow from the car in the travel of said plow along said offset and adapted to support said plow when disengaged from the car, a plow pit-vault in which said channel-rails are located, and a vertical offset in said channel-rails for guiding the disengaged plow into the plow pit-vault.

35. In an electric railway, a car adapted to travel thereon and provided with a propelling-motor, conductor-rails for the electric current, a plow consisting of front and rear legs, an insulated cap-box located around the upper ends of said legs, insulated shoe-boxes at the lower ends of said legs, a yielding shoe on each side located in said insulated shoe-boxes and adapted to move in contact with said conductor-rails to carry the electric current to and from said motor, an insulated conducting-wire located in each leg, flexible wires connecting said yielding shoes with said insulated conducting-wires in the legs of the plow, a cross-bar connected to said front and rear legs for preventing the rear leg from engaging with notches in the slot-rail in the travel of the plow, a positive and a negative contact-head on said insulated cap-box, an insulated contact-box, a yielding positive and a yielding negative contact-bar located on opposite sides of said contact-box and supported thereby and respectively in contact with said positive and negative contact-heads and adapted to be automatically kept in contact therewith, insulated positive and negative connection-stems respectively connected to the positive and negative contact-bars, and positive and negative electric wires leading to and from said motor connected respectively to the positive and negative connection-stems.

36. In an electric railway, a car adapted to travel thereon and provided with a propelling-motor, conductor-rails for the electric current, a plow adapted to move in contact with said conductor-rails to carry the electric current to and from said motor for propelling the car, mechanism for connecting said plow to the car, means for disengaging said plow from the car, a plow pit-vault into which said plow is adapted to move when disengaged from the car, hinged drop-traps normally closing the entrance to said plow pit-vault, mechanism for opening said drop-traps to permit the travel of the disengaged plow into the plow pit-vault, and means for supporting said disengaged plow in its travel into said plow pit-vault.

37. In an electric railway, a car adapted to travel thereon and provided with a propelling-motor, conductor-rails for the electric current, a plow adapted to move in contact with said conductor-rails to carry the electric current to and from said motor for propelling the car, mechanism for connecting said plow to the car, means for disengaging said plow from the car, a plow pit-vault into which said plow is adapted to move when disengaged from the car, hinged drop-traps normally closing the entrance to said plow pit-vault, mechanism for opening said drop-traps to permit the travel of the disengaged plow into the plow pit-vault, and means for guiding said disengaged plow into the plow pit-vault and adapted to support said disengaged plow in its travel into said plow pit-vault.

38. In an electric railway, a car adapted to travel thereon and provided with a propelling-motor, conductor-rails for the electric current, a plow adapted to move in contact with said conductor-rails to carry the electric current to and from said motor for propelling the car, a contact-box plate, an insulated contact-box secured thereto, and supporting-hangers connected to said contact-plate for supporting the plow in its connection with the car.

39. In an electric railway, a car adapted to travel thereon and provided with a propelling-motor, conductor-rails for the electric current, a plow adapted to move in contact with said conductor-rails to carry the electric current to and from said motor for propelling the car, a contact-box plate, an insulated contact-box secured thereto, and supporting-hangers connected to said contact-plate and open at both ends for supporting the plow in its connection with the car.

40. In an electric railway, a car adapted to travel thereon and provided with a propelling-motor, conductor-rails for the electric current, a plow adapted to move in contact with said conductor-rails to carry the electric current to and from said motor for propelling the car, mechanism for connecting said plow to the car, a contact-box having automatically-adjustable contact-bars with which said plow is in contact when said plow is connected to said contact-box, slot-rails in which said plow is adapted to move and which automatically disengages the plow from the car when the travel of said plow diverges in a horizontal plane from the line of travel of the car.

41. In an electric railway, a car adapted to travel thereon and provided with a propelling-motor, conductor-rails to carry the electric current to and from said motor for propelling the car, slot-rails in which said plow is adapted to move, channel-rails located in the conduit below the slot-rails and adapted to support said plow when disengaged from the car, mechanism for connecting the said plow, and yielding means to stop the plow in its travel along said channel-rails, after disengagement of said plow from the car.

42. In an electric railway, a car adapted to travel thereon and provided with a propelling-motor, conductor-rails for the electric current, a contact-box, a plow consisting of front and rear legs, an insulated cap-box located around the open ends of said legs and provided with contact-heads, insulated shoe-boxes at the lower ends of said legs, a yielding shoe on each side located within the said shoe-boxes, and adapted to move in contact with said conductor-rails to carry the electric current to and from said motor, and insulating conductor-wire connecting said contact-heads with the flexible wires of the said yielding shoes, the said contact-box being provided with contact-bars in electrical connection with the contact-head of the plow and with stems to which are secured the positive and negative wires, leading to and from said motor.

43. In an electric railway, a car adapted to travel thereon and provided with a propelling-motor, conductor-rails for the electric current, a plow adapted to move in contact with said rails to carry the electric current to and from said motor for propelling the car, a slot in which said plow is adapted to move, channel-rails located in the conduit below the slot-rails and adapted to support said plow when disengaged from the car and to guide it into the plow pit-vault, means for disengaging said plow from the car, and guide-rails located in said plow pit-vault to prevent the rocking of the plow, after disengaging said plow from the car.

44. In an electric railway, a car adapted to travel thereon and provided with a propelling-motor, conductor-rails for the electric current, a plow pit-vault, a plow adapted to move in contact with said conductor-rails to carry the electric current to and from said motor for propelling the car and provided with rollers, slot-rails in which said plow is adapted to move in the travel of the car, channel-rails by which said rollers on the plow are guided, and which are adapted to support the plow when disengaged from the car and carry it into the plow pit-vault.

45. In an electric railway, a car adapted to travel thereon and provided with a propelling-motor, conductor-rails for the electric current, a plow pit-vault, a plow adapted to move in contact with said conductor-rails to carry the electric current to and from said motor for propelling the car and provided with rollers, slot-rails into which the plow is adapted to move in the travel of the car, and means for disengaging the plow from the car, channel-rails curved in a horizontal plane and in a vertical plane, and again in a horizontal plane, into which the rollers of said plow are guided and which are adapted to support the plow when disengaged from the car and to carry it down into the plow pit-vault, and mechanism for connecting said plow to the car.

46. In an electric railway, a car adapted to travel thereon and provided with a propelling-motor, positive and negative conductor-rails for the electric current, a contact-box, a plow adapted to be connected with said contact-box and to move in contact with said conductor-rails to carry the electric current to and from said motor for propelling the car, and automatically-adjustable means on said contact-box with which said plow is in contact when connected to the contact-box and through which the electric current passes to and from the plow.

47. In an electric railway, a car adapted to travel thereon and provided with a propelling-motor, positive and negative conductor-rails for the electric current, a contact-box, a plow adapted to be connected with said contact-box and to move in contact with said conductor-rails to carry the electric current to and from said motor for propelling the car, automatically-adjustable means on said contact-box with which said plow is in contact when connected to the contact-box and through which the electric current passes to and from the plow, and means for disengaging said plow from said contact-box.

48. In an electric railway, a car adapted to travel thereon and provided with a propelling-motor, positive and negative conductor-rails for the electric current, a contact-box, a plow adapted to be connected with said contact-box and to move in contact with said conductor-rails to carry the electric current to and from said motor for propelling the car, automatically-adjustable means on said contact-box with which said plow is in contact when connected to the contact-box and through which the electric current passes to and from the plow, and means for automatically disengaging said plow from said contact-box.

49. In an electric railway, a car adapted to travel thereon and provided with a propelling-motor, conductor-rails for the electric current, a plow adapted to move in contact with said conductor-rails to carry the electric current to and from said motor for propelling the car and provided with jaws by which it is supported, supporting-hangers for supporting the plow in its connection with the car and provided with inwardly-turned flanges tapering at the ends and adapted to fit between said jaws and thereby support the plow.

In testimony whereof we have signed our names to this specification, in the presence of subscribing witnesses, on this 24th day of February, 1896.

SAMUEL GLENVILLE BROSIUS.
WILLIAM BAYLY UPTON.
JOSEPH COLVIN.

Witnesses:
H. WOOD,
E. McL. LONG.